US011361073B2

(12) United States Patent
Koide et al.

(10) Patent No.: US 11,361,073 B2
(45) Date of Patent: Jun. 14, 2022

(54) ANALYSIS APPARATUS, ANALYSIS METHOD, AND ANALYSIS PROGRAM

(71) Applicant: NIPPON TELEGRAPH AND TELEPHONE CORPORATION, Tokyo (JP)

(72) Inventors: Takashi Koide, Musashino (JP); Daiki Chiba, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 142 days.

(21) Appl. No.: 16/962,228

(22) PCT Filed: Sep. 19, 2018

(86) PCT No.: PCT/JP2018/034624
§ 371 (c)(1),
(2) Date: Jul. 15, 2020

(87) PCT Pub. No.: WO2019/142398
PCT Pub. Date: Jul. 25, 2019

(65) Prior Publication Data
US 2021/0064746 A1 Mar. 4, 2021

(30) Foreign Application Priority Data
Jan. 17, 2018 (JP) .............................. JP2018-005695

(51) Int. Cl.
*G06F 15/16* (2006.01)
*G06F 21/56* (2013.01)
(Continued)

(52) U.S. Cl.
CPC .......... *G06F 21/563* (2013.01); *G06F 21/125* (2013.01); *G06F 21/128* (2013.01);
(Continued)

(58) Field of Classification Search
CPC .... G06F 21/563; G06F 21/125; G06F 21/128; G06F 21/44; H04L 67/02; H04L 67/146
(Continued)

(56) References Cited

U.S. PATENT DOCUMENTS 8,683,584 B1    3/2014 Daswani et al.
9,614,863 B2 *  4/2017 Kim .................... H04L 63/1408
(Continued)

FOREIGN PATENT DOCUMENTS

JP    10-207756 A     8/1998
JP    2007-522582 A   8/2007
WO    2016/109283 A1  7/2016

OTHER PUBLICATIONS

International Search Report and Written Opinion dated Dec. 18, 2018 for PCT/JP2018/034624 filed on Sep. 19, 2018, 8 pages including English Translation of the International Search Report.
(Continued)

*Primary Examiner* — Moustafa M Meky
(74) *Attorney, Agent, or Firm* — Xsensus LLP

(57) ABSTRACT

An analysis apparatus includes a category classification unit that accesses a URL of an analysis target Web page and classifies the analysis target Web page into a category, an operation target detection unit that detects an operation target of user operation from the analysis target Web page in accordance with a detection method that is set in advance for the classified category, an operation execution unit that performs operation on the detected operation target, a function hook unit that detects an operation event that occurs after the operation has been performed on the operation target, and a log output unit that outputs log data in which communication that has occurred due to the operation, the detected operation event, and a Web browser screen that has
(Continued)

been changed due to the operation are associated with the URL of the analysis target Web page.

7 Claims, 13 Drawing Sheets

(51) Int. Cl.
*G06F 21/12* (2013.01)
*G06F 21/44* (2013.01)
*H04L 67/02* (2022.01)
*H04L 67/146* (2022.01)

(52) U.S. Cl.
CPC .............. *G06F 21/44* (2013.01); *H04L 67/02* (2013.01); *H04L 67/146* (2013.01); *G06F 2221/2119* (2013.01)

(58) Field of Classification Search
USPC ........................................................ 709/200
See application file for complete search history.

(56) References Cited

U.S. PATENT DOCUMENTS

| | | | |
|---|---|---|---|
| 10,484,424 B2* | 11/2019 | Tao | G06F 21/55 |
| 10,567,407 B2* | 2/2020 | Tang | G06F 16/951 |
| 2010/0186088 A1 | 7/2010 | Banerjee et al. | |
| 2016/0205125 A1* | 7/2016 | Kim | H04L 63/1408 726/23 |
| 2016/0294867 A1* | 10/2016 | Tao | H04L 63/1416 |
| 2018/0041530 A1* | 2/2018 | Tang | G06F 16/951 |

OTHER PUBLICATIONS

Duman, et al., "TrueClick: Automatically Distinguishing Trick Banners from Genuine Download Links," ACSAC '14: Proceedings of the 30th Annual Computer Security Applications Conference, Dec. 8-12, 2014, 10 pages.

Invernizzi, et al., "Evilseed: A Guided Approach to Finding Malicious Web Pages," 2012 IEEE Symposium on Security and Privacy, 2012, 15 pages.

Moshchuk, et al., "A Crawler-based Study of Spyware on the Web," Network and Distributed System Security Symposium, 2006, pp. 1-17.

Nelms, et al., "Towards Measuring and Mitigating Social Engineering Software Download Attacks," USENIX Association, 25th USENIX Security Symposium, Austin, TX, Aug. 10-12, 2016, pp. 773-789.

Extended European Search Report dated May 3, 2021, in corresponding European Patent Application No. 18900705.7.

Extended European Search Report dated Oct. 7, 2021, in corresponding European Patent Application No. 18900705.7.

* cited by examiner

FIG.3

| SERIAL NUMBER | URL | FEATURE INFORMATION | | | |
|---|---|---|---|---|---|
| | | DOMAIN NAME | PRESENCE/ABSENCE OF video TAG | PAGE HEIGHT | PRESENCE/ABSENCE OF CHARACTER STRING "Wait 5 seconds" |
| 1 | http://movie.example.com/ | movie.example.com | 1 | 1700 | 0 |
| 2 | http://game.example.com | | 0 | 500 | 1 |
| ⋮ | ⋮ | ⋮ | ⋮ | ⋮ | ⋮ |

FIG.4

| SERIAL NUMBER | URL | CATEGORY |
|---|---|---|
| 1 | http://www.movie.example.com/ | BASIC PAGE |
| 2 | http://movie.example.com/ | VIDEO PAGE |
| 3 | http://download.example.com/ | DOWNLOAD PAGE |
| 4 | http://redirect.example.com/ | INTERMEDIATE PAGE |
| 5 | http://social.example.com/ | SOCIAL MEDIA PAGE |
| ... | ... | ... |

FIG.5

| SERIAL NUMBER | DETECTION TARGET | CSS SELECTOR | XPath |
|---|---|---|---|
| 1 | WEB ELEMENT FOR WHICH "Download" IS INCLUDED IN class PROPERTY | *[class*='Download'] | - |
| 2 | WEB ELEMENT OF img TAG FOR WHICH "Download" IS INCLUDED IN Src PROPERTY | img[src*='Download'] | - |
| 3 | Web ELEMENT OF LING a TAG OF FILE FOR WHICH "exe" IS INCLUDED IN EXTENSION | a[href$='exe'] | - |
| 4 | WEB ELEMENT FOR WHICH "Play NOW" IS INCLUDED IN TEXT CONTENT | - | //*[contains(text(), 'Play Now')] |
| ... | ... | ... | ... |

```
<html>
<head>… </head>
<body>
…
<a class="download-button">link</a>  } R1
…
<img src="/download.png"></img>  } R2
…
<a href="http://example.com/game.exe">Download link</a>  } R3
…
<div>Play Now</div>  } R4
…
…
</body>
</html>
```

| SERIAL NUMBER | HORIZONTAL SIDE | VERTICAL SIDE | WIDTH | HEIGHT | SECOND KEYWORD USED FOR DETECTION |
|---|---|---|---|---|---|
| 1 | 100 | 300 | 300 | 600 | Download |
| 2 | 200 | 400 | 400 | 800 | Click Here |
| ... | ... | ... | ... | ... | ... |

IMAGE ELEMENT 1
(HORIZONTAL SIDE=110px, VERTICAL SIDE=190px, WIDTH=600px, HEIGHT=100px)

Web ELEMENT 1
(HORIZONTAL SIDE=100px, VERTICAL SIDE=200px, WIDTH=500px, HEIGHT=100px)

FIG.11

| SERIAL NUMBER | OPERATION EVENT | OPERATION TARGET | | | | | | |
|---|---|---|---|---|---|---|---|---|
| | | COORDINATE | | REGION SIZE | | IMAGE | OPERATION | URL |
| | | HORIZONTAL SIDE | VERTICAL SIDE | WIDTH | HEIGHT | | | |
| 1 | FILE DOWNLOAD | 300 | 400 | 500 | 100 | Download | CLICK | http://game.example.com |
| 2 | INSTALLATION OF BROWSER EXTENSION FUNCTION | 400 | 500 | 400 | 300 | ▲ | CLICK | http://movie.example.com |
| 3 | DISPLAY OF ALERT DIALOG | - | - | - | - | - | RETURN OPERATION | http://www.example.com |
| ... | ... | ... | ... | ... | ... | ... | ... | ... |

ANALYSIS APPARATUS, ANALYSIS METHOD, AND ANALYSIS PROGRAM

CROSS-REFERENCE TO RELATED APPLICATIONS

The present application is based on PCT filing PCT/JP2018/034624, filed Sep. 19, 2018, which claims priority to JP 2018-005695, filed Jan. 17, 2018, the entire contents of each are incorporated herein by reference.

FIELD

The present invention relates to an analysis apparatus, an analysis method, and an analysis program.

BACKGROUND

Infection by malware that is a collective term of malicious software is often caused by Web page browsing by a user. A Drive-By Download (DBD) attack is used when the malware hacks into the user. The DBD attack is an attack that automatically transfers a user who has connected to a Web page to an attack page and infects the user with malware by using a Web browser. The DBD attack exploits a vulnerability of the Web browser or a plug-in introduced in the Web browser to infect the user with malware.

To analyze a Web page that may cause the DBD attack to occur, a method of using a Web client honey pot that is a decoy system having a vulnerability is known, in addition to a method of patrolling Web pages. In this method, a Web page is analyzed by using the Web client honey pot, and if it is determined that the Web page is malicious and may cause the DBD attack to occur, communication destination information represented by a Uniform Resource Locator (URL), a domain name, and an Internet Protocol (IP) address of the Web page is set as a blacklist. Then, each of security apparatuses blocks Web access to the blacklist, to thereby prevent a user from being infected with malware.

CITATION LIST

Non Patent Literature

Non Patent Literature 1: L. Invernizzi, P. M. Comparetti, S. Benvenuti, C. Kruegel, M. Cova, and G. Vigna, "EVIL-SEED: A Guided Approach to Finding Malicious Web Pages", IEEE S&P., pp. 428-442, 2012.
Non Patent Literature 2: T. Nelms, R. Perdisci, M. Antonakakis, and M. Ahamad, "Towards Measuring and Mitigating Social Engineering Software Download Attacks", USENIX Security Symposium, pp. 773-789, 2016.
Non Patent Literature 3: S. Duman, K. Onarlioglu, A. O. Ulusoy, W. Robertson, and E. Kirda, "TrueClick: Automatically Distinguishing Trick Banners from Genuine Download Links", ACSAC, 2014.
Non Patent Literature 4: A. Moshchuk, T. Bragin, S. D. Gribble, and H. M. Levy, "A Crawler-based Study of Spyware on the Web", The Network and Distributed System Security Symposium, 2006.

SUMMARY

Technical Problem

To generate the blacklist indicating the communication destination information on a malicious Web page, it is necessary to analyze a Web page and analyze occurrence or non-occurrence of an attack via the Web page.

Here, a number of operable portions are present on a Web page, and there is an attack that downloads malware by using operation performed on the operable portions by a user as a starting point. Further, there is another attack that changes transition of Web pages and structures of Web pages and lead to a plurality of kinds of operation.

A conventional Web page patrol technology and a conventional Web client honey pot are technologies for passively analyzing occurrence of an attack. Therefore, in the conventional Web page patrol technology and the conventional Web client honey pot, it is difficult to observe an attack that leads to user operation and that occurs only when operation is performed.

Further, a technology for reconstructing transition of Web pages is known. The technology for reconstructing transition of Web pages is a technology for observing a Web traffic by a proxy server or a Deep Packet Inspection (DPI) and constructing an attack that leads to user operation by using downloading of malware as a starting point. However, in the technology for reconstructing transition of Web pages, it is difficult to accurately reproduce a number of user's operation contents and operation targets, so that it is difficult to observe the attack that leads to user operation.

In this manner, in the conventional technology, it is difficult to observe an attack that leads to user operation, and it is difficult to analyze occurrence or non-occurrence of an attack via a Web page.

The present invention has been conceived in view of the foregoing situations, and an object is to provide an analysis apparatus, an analysis method, and an analysis program capable of observing an attack that leads to user operation via a Web page.

Solution to Problem

An analysis apparatus that analyzes a Uniform Resource Locator (URL) of a Web page, the analysis apparatus includes: a classification unit configured to, upon receiving input of an URL of an analysis target Web page, access the URL of the analysis target Web page and classify the analysis target Web page into a category that is an index indicating a Web page leading method; a first detection unit configured to detect an operation target of user operation from the analysis target Web page in accordance with a detection method that is set in advance for the category classified by the classification unit;
an execution unit configured to execute operation on the operation target detected by the first detection unit;
a second detection unit configured to detect an operation event that occurs after the execution unit has performed the operation on the operation target; and an output unit configured to output log data in which communication that has occurred due to the operation performed by the execution unit, the operation event detected by the second detection unit, and a Web browser screen that has been changed due to the operation performed by the execution unit are associated with the URL of the analysis target Web page.

Advantageous Effects of Invention

According to the present invention, it is possible to observe an attack that leads to user operation via a Web page.

BRIEF DESCRIPTION OF DRAWINGS

FIG. 3 is a diagram illustrating an example of feature information that is extracted from a Web page by a feature extraction unit illustrated in FIG. 2.

FIG. 4 is a diagram illustrating an example of a category that is determined by a category determination unit illustrated in FIG. 2.

FIG. 5 is a diagram illustrating an example of a detection target of a Hypertext Markup Language (HTML) analysis unit illustrated in FIG. 2.

FIG. 11 is a diagram illustrating an example of an operation event detected by a function hook unit illustrated in FIG. 2, an operation target, and operation.

DESCRIPTION OF EMBODIMENTS

One embodiment of the present invention will be described in detail below with reference to the drawings. The present invention is not limited to the embodiment below. Further, in the description of the drawings, the same components are denoted by the same reference symbols.

Embodiment

Figure 1:
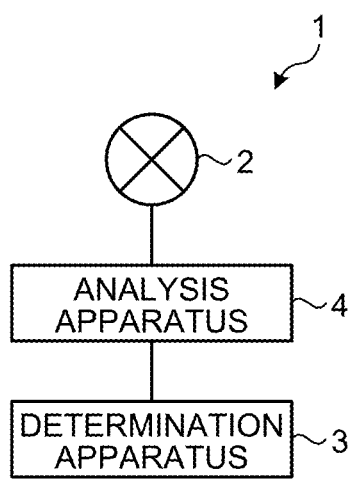
FIG. 1 is a diagram illustrating an example of a configuration of an analysis system according to an embodiment.

An embodiment of the present invention will be described. FIG. 1 is a diagram illustrating an example of a configuration of an analysis system according to the embodiment.

As illustrated in FIG. 1, an analysis system 1 according to the embodiment includes a determination apparatus 3 and an analysis apparatus 4 that is arranged between a network 2 and the determination apparatus 3. The analysis apparatus 4 is connected to an external apparatus (not illustrated) via the network 2.

The analysis apparatus 4 analyzes an input Web page to identify a URL of a Web page that leads to user operation. The analysis apparatus 4 actively performs operation on Web pages that are collected via the network 2, and observes an attack that leads to user operation via a Web page. The analysis apparatus 4 detects, as an operation target, a portion that leads to user operation on a Web page, and outputs log data in which the operation target and an operation content related to the operation target are recorded to the determination apparatus 3. Meanwhile, the attack that leads to user operation is an attack that exploits a user's psychological blind spot by attracting the interest of a user, giving a warning, or deceiving the user, to thereby lead the user him/herself to install malware.

The determination apparatus 3 refers to the log data output by the analysis apparatus 4, acquires malware or a malicious browser extension function, and identifies an operation content or an operation target that leads to an attack. Then, the determination apparatus 3 refers to the log data output by the analysis apparatus 4, and determines a URL of a Web page that causes an attack leading to user operation to occur. The determination apparatus 3 generates a blacklist based on a determination result. Then, each of security apparatuses (not illustrated) blocks Web access to the blacklist, to thereby prevent the user from being infected with malware.

Here, with regard to the attack that leads to user operation, how much user operation leading to the attack is generated is important for an attacker. From this perspective, it is conceivable that leading by displaying a download button of digital data may be widely performed. The analysis apparatus 4 actually accesses a URL of a Web page, detects a portion that leads to user operation on the Web page, and actively performs operation, to thereby cause the attack leading to user operation to occur and observe the attack.

[Configuration of Analysis Apparatus]

Figure 2:
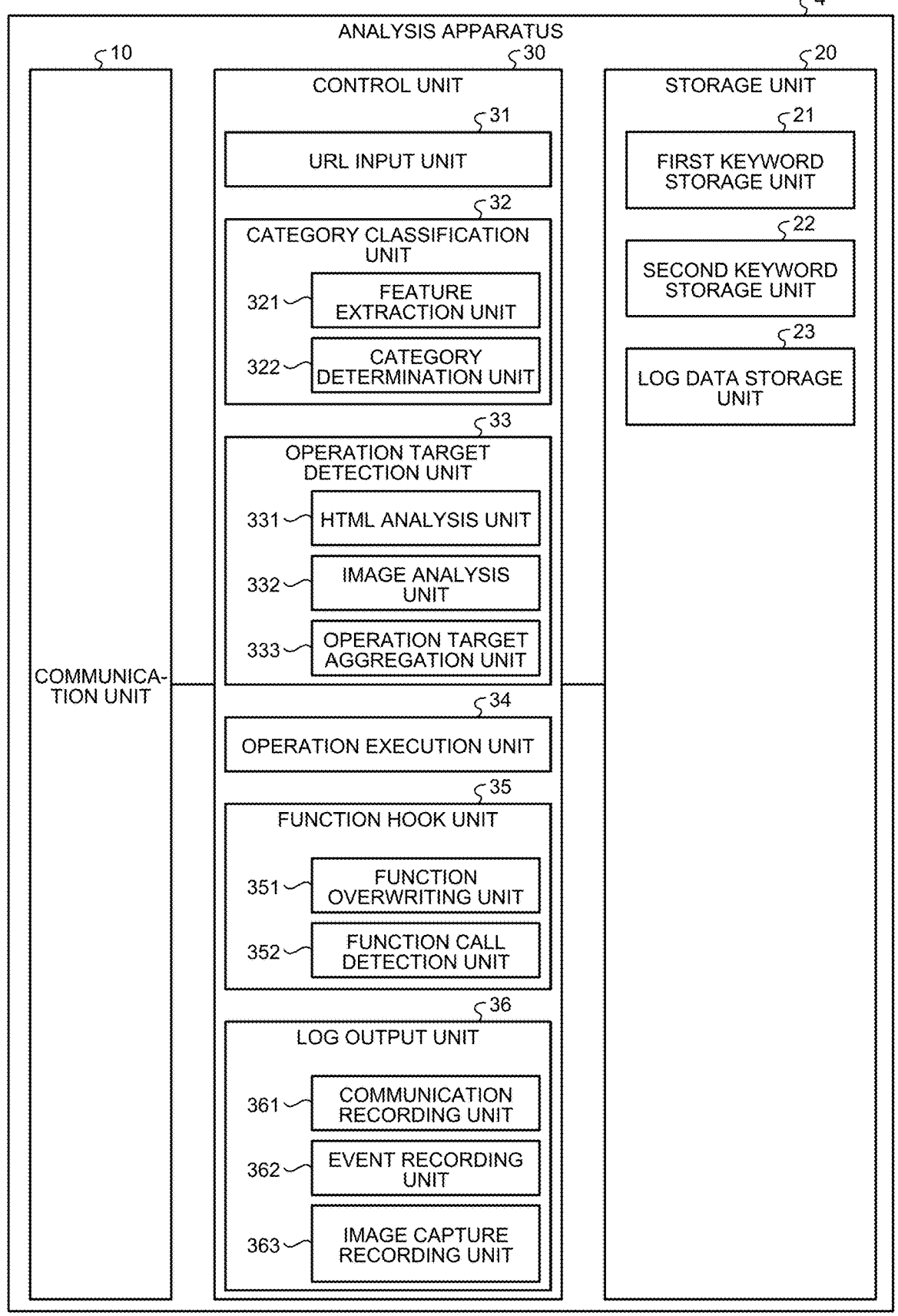
FIG. 2 is a diagram illustrating an example of a configuration of an analysis apparatus illustrated in FIG. 1.

A configuration of the analysis apparatus 4 will be described below. FIG. 2 is a diagram illustrating an example of the configuration of the analysis apparatus 4 illustrated in FIG. 1. As illustrated in FIG. 2, the analysis apparatus 4 includes a communication unit 10, a storage unit 20, and a control unit 30. Further, the analysis apparatus 4 includes an input interface (not illustrated) that receives various kinds of operation from an operator, and an output apparatus (not illustrated) that is implemented by a display apparatus, a printing apparatus, an information communication apparatus, or the like.

The communication unit 10 is a communication interface that transmits and receives various kinds of information to and from other apparatuses that are connected via the network 2 or the like. The communication unit 10 is implemented by a Network Interface Card (NIC) or the like, and performs communication between the other apparatuses and the control unit 30 (to be described later) via a telecommunication line, such as a Local Area Network (LAN) or the Internet. For example, the communication unit 10 collects Web pages via the network 2. Further, the communication unit 10 outputs a Web page observation result that is obtained by the control unit 30, as a log, to the determination apparatus 3. Specifically, the log is data in which communication that has occurred due to actual operation performed on an operation target on a Web page, an operation event that occurs after execution of the operation, and a Web browser screen that has been changed due to the operation are associated with the URL of the Web page as an analysis target.

The storage unit 20 is a storage device, such as a Hard Disk Drive (HDD), a Solid State Drive (SSD), or an optical disk. Meanwhile, the storage unit 20 may be a data rewritable semiconductor memory, such as a Random Access Memory (RAM), a flash memory, or a Non Volatile Static Random Access Memory (NVSRAM). The storage unit 20 stores therein an Operating System (OS) and various programs that are executed by the analysis apparatus 4. Further, the storage unit 20 stores therein various kinds of information that are used in execution of the program. The storage unit 20 includes a first keyword storage unit 21, a second keyword storage unit 22, and a log data storage unit 23.

The first keyword storage unit 21 stores therein a first keyword. The first keyword is a character string that is included in a Web element, such as a button or a link, in a Web page. The first keyword is set in advance for each of categories of Web pages. For example, if a Web page is a download page, the first keyword may be "Download". Further, if a Web page is a video page, the first keyword may be "Play Now". The first keyword is not limited to the character strings as described above. By setting the first keyword for each of the categories, an operation target detection unit 33 (to be described later) is able to appropriately detect, as an operation target, a Web element that leads to different user operation for each of Web pages.

The second keyword storage unit 22 stores therein a second keyword. The second keyword is a character string that is drawn on a Web element that leads to user operation. The second keyword is set for each of the categories. For example, a character string, such as "Download", "Play Now", or "Click Here", is set as the second keyword. The second keyword is not limited to the character strings as described above. By setting the second keyword for each of the categories, the operation target detection unit 33 (to be described later) is able to appropriately detect, as an operation target, an image element that leads to different user operation for each of Web pages.

The log data storage unit 23 stores therein the log data generated by a log output unit 36. The log data is data in which communication that has occurred due to actual operation on the operation target that leads to user operation on the Web page, an operation event that has occurred after execution of the operation, and a Web browser screen that has been changed due to the operation are associated with the URL of the analysis target Web page.

The control unit 30 controls the entire analysis apparatus 4. The control unit 30 is, for example, an electronic circuit, such as a Central Processing Unit (CPU) or a Micro Processing Unit (MPU), or an integrated circuit, such as an Application Specific Integrated Circuit (ASIC) or a Field Programmable Gate Array (FPGA). Further, the control unit 30 includes an internal memory for storing a program that defines various processing procedures and control data, and performs various processes by using the internal memory. Furthermore, the control unit 30 functions as various kinds of processing units by executing various programs. The control unit 30 includes an URL input unit 31, a category classification unit 32 (classification unit), the operation target detection unit 33 (first detection unit), an operation execution unit 34 (execution unit), a function hook unit 35 (second detection unit), and the log output unit 36 (output unit).

The URL input unit 31 receives, as input, a URL of an analysis target Web page. The URL of the analysis target Web page is input from an external apparatus (not illustrated) via the network 2 and the communication unit 10, for example.

If the URL input unit 31 receives the URL of the analysis target Web page, the category classification unit 32 accesses the URL of the analysis target Web page, and classifies the analysis target Web page into a category that is an index indicating a Web page leading method. The category is an index indicating the Web page leading method. Web pages in different categories include Web elements that lead to different kinds of user operation. The category classification unit 32 performs category classification in such a manner that the operation target detection unit 33 is able to select a rule for appropriately detecting an operation target Web element in accordance with a Web page.

The category is, for example, a download page, an intermediate page, a social media page, a video page, or the like. The download page is a Web page in which a download button is present and a file may be downloaded by operating the download button. The intermediate page is a Web page in which it is indicated that redirection to a different Web page is completed halfway and for which operation on a skip button or a wait for completion is needed. The social media page is a Web page in which a user is able to post a video or a message. The video page is a Web page in which a streaming video is replayed. Meanwhile, the categories are not limited to items as described above. Further, if the analysis target Web page is changed, the category classification unit 32 classifies the changed Web page into a certain category.

The operation target detection unit 33 detects an operation target of the user operation from the analysis target Web page in accordance with a detection method that is set in advance for the category classified by the category classification unit 32. If the category classification unit 32 classifies the category of the Web page, the operation target detection unit 33 detects the operation target from the Web page.

The operation target detection unit 33 detects, as the operation target, a Web element that leads to user operation and that is different for each of Web pages, by using the first keyword. The Web element is one of elements of HTML. Further, the operation target detection unit 33 detects, as the operation target, an image element that leads to user operation and that is different for each of Web pages. The image element is a region that can be distinguished by an image processing technique represented by edge detection on a screen drawn by the Web browser.

The operation execution unit 34 performs operation on the operation target detected by the operation target detection unit 33. The operation execution unit 34 sequentially performs operation on the operation target detected by the operation target detection unit 33.

The function hook unit 35 detects an operation event that occurs after the operation execution unit 34 has performed the operation on the operation target. The function hook unit 35 detects a change of the Web page caused by the operation performed by the operation execution unit 34. The function hook unit 35 overwrites, at the time of reading the Web page, a JavaScript function that is set in advance, and adds a process of giving a notice when the function is called. Upon receiving the notice, the function hook unit 35 detects the call of the JavaScript function, to thereby detect the operation event.

The log output unit 36 stores the log data in the log data storage unit 23 and outputs the log data to the determination apparatus 3. The log data is data in which communication that has occurred due to the operation performed by the operation execution unit 34, the operation event that is detected by the function hook unit 35, and the Web browser screen that has been changed due to the operation performed by the operation execution unit 34 are associated with the URL of the analysis target Web page. The determination apparatus 3 refers to the log data output by the analysis apparatus 4, and determines a URL of a Web page in which an attack that leads to user operation occurs.

[Category Classification Unit]

A configuration of the category classification unit 32 will be described below. The category classification unit 32 includes a feature extraction unit 321 (extraction unit) and a category determination unit 322 (determination unit).

The feature extraction unit 321 extracts feature information for determining the category of the Web page. Specifically, the feature extraction unit 321 accesses the URL of the analysis target Web page. Then, the feature extraction unit 321 extracts, as the feature information, communication destination information on the accessed Web page, HTML source code information, or screen information on the Web browser screen. The feature extraction unit 321 extracts a URL or a domain name as the communication destination information on the Web page.

FIG. 3 is a diagram illustrating an example of the feature information that is extracted from the Web page by the feature extraction unit 321 illustrated in FIG. 2. As illustrated in each of items in FIG. 3, the feature information on the Web page includes the communication destination information, such as a domain name or a URL, presence or absence of a video tag, the HTML source code information indicating presence or absence of a specific character string (for example, "Wait 5 seconds") indicating an intermediate page or the like, and image information indicating a height of a page drawn in the Web browser. Meanwhile, as for the presence or absence of the tag and the presence or absence of the character string, the feature extraction unit 321 adopts, as the feature information, "1" for the presence and "0" for the absence. Further, the feature information is not limited to the items as described above.

For example, the feature extraction unit 321 extracts, from a Web page identified by a URL of "http://movie.example.com/" on which Web access is performed, a domain name of "movie.example.com", "1" indicating the presence of a video tag, a page height of "1700", and "0" indicating the absence of a character string of "Wait 5 seconds" (see a serial number "1").

The category determination unit 322 determines a category of the Web page on the basis of a feature amount extracted by the feature extraction unit 321. The category determination unit 322 classifies the Web page into, for example, the download page, the intermediate page, the social media page, the video page, or a basic page, on the basis of the feature amount extracted by the feature extraction unit 321.

Specifically, if a domain name of a URL matches a domain name of a known social media site, the category determination unit 322 classifies a Web page identified by the URL into the social media page. Further, if the video tag is present in an HTML source code extracted from a Web page, the category determination unit 322 classifies the Web page identified by a corresponding URL into the video page.

Furthermore, if a character string indicating the intermediate page is present in an HTML source code extracted from a Web page, the category determination unit 322 classifies the Web page identified by a corresponding URL into the intermediate page. Moreover, if a height of a Web page is equal to or larger than a predetermined threshold, the category determination unit 322 classifies the Web page identified by a corresponding URL into the download page. Then, the category determination unit 322 classifies Web pages that are not classified into the categories as described above into the basic page.

FIG. 4 is a diagram illustrating an example of the category that is determined by the category determination unit 322 illustrated in FIG. 2. As illustrated in FIG. 4, the category determination unit 322 classifies a URL of "http://movie.example.com/", for which the video tag is present in the HTML source code, into the video page (see a serial number "2"). The category determination unit 322 classifies a Web page that is identified by a URL of "http://download.example.com/" and that has a height equal to or larger than a predetermined threshold into the download page (see a serial number "3").

Further, the category determination unit 322 classifies a Web page that is identified by a URL of "http://redirect.example.com/", for which a character string indicating the intermediate page is present in the HTML source code, into the intermediate page (see a serial number "4"). The category determination unit 322 classifies a Web page that is identified by a URL of "http://social.example.com/", for which a domain name matches a domain name of a known social media site, into the social media page (see a serial number "5"). Then, the category determination unit 322 classifies a Web page identified by a URL of "http://www.movie.example.com/" that is not classified into the categories as described above into the basic page (see a serial number "1").

While the example has been described above in which the Web page and the category have one-to-one correspondence, embodiments are not limited thereto. For example, it may be possible to flexibly cope with category classification in such a manner that a category is extended like a mixed category ("download+video" category) for a Web page that has features of a plurality of categories.

[Operation Target Detection Unit]

A configuration of the operation target detection unit 33 will be described below. The operation target detection unit 33 includes an HTML analysis unit 331 (first analysis unit), an image analysis unit 332 (second analysis unit), and an operation target aggregation unit 333 (aggregation unit).

The HTML analysis unit 331 extracts, by performing a character string search, a Web element that includes a predetermined character string from the HTML source code extracted by the feature extraction unit 321. The predetermined character string is a character string that is set in advance for the category classified by the category classification unit 32.

Here, the Web element is one of elements of HTML. For example, the HTML analysis unit 331 uses a CSS selector function implemented in the browser or a tool that performs browser operation in order to detect the Web element in HTML. Further, XPath is known as a function to detect the Web element similarly to the CSS selector. The HTML analysis unit 331 uses the XPath function to detect the Web element in HTML.

The HTML analysis unit 331, to detect a Web element that leads to user operation, performs a search using the CSS selector or the Xpath by using, as the first keyword, a character string that is included in a property of the Web element or in a text content enclosed by a tag. As described above, the first keyword is set in advance for each of the categories of Web pages and stored in the first keyword storage unit 21. For example, if the category is the download page, the first keyword may be "Download", and if the category is the video page, the first keyword may be "Play Now".

The HTML analysis unit 331 is able to appropriately detect a Web element that leads to user operation and that is different for each of Web pages, by searching for the first keyword that is set for each of the categories from the HTML source code. Meanwhile, the function to search for a Web element is not limited to the CSS selector and the XPath.

FIG. 5 is a diagram illustrating an example of the detection target of the HTML analysis unit 331 illustrated in FIG. 2. As illustrated in FIG. 5, if the detection target is a "Web element for which "Download" is included in a class property", the HTML analysis unit 331 sets "*[class*='Download']" in the CSS selector (see a serial number "1"). Then, as indicated by serial numbers "2" and "3", the CSS selectors are set in accordance with search targets. Further, if the detection target is a "Web element for which "Play Now" is included in a text content", the HTML analysis unit 331 sets "//*[contains(text( ), 'Play Now')]" as a search condition for the XPath (see a serial number "4"). Meanwhile, the CSS selector and the XPath used as the detection targets are not limited to those illustrated in the figure.

Figures 6, 7:
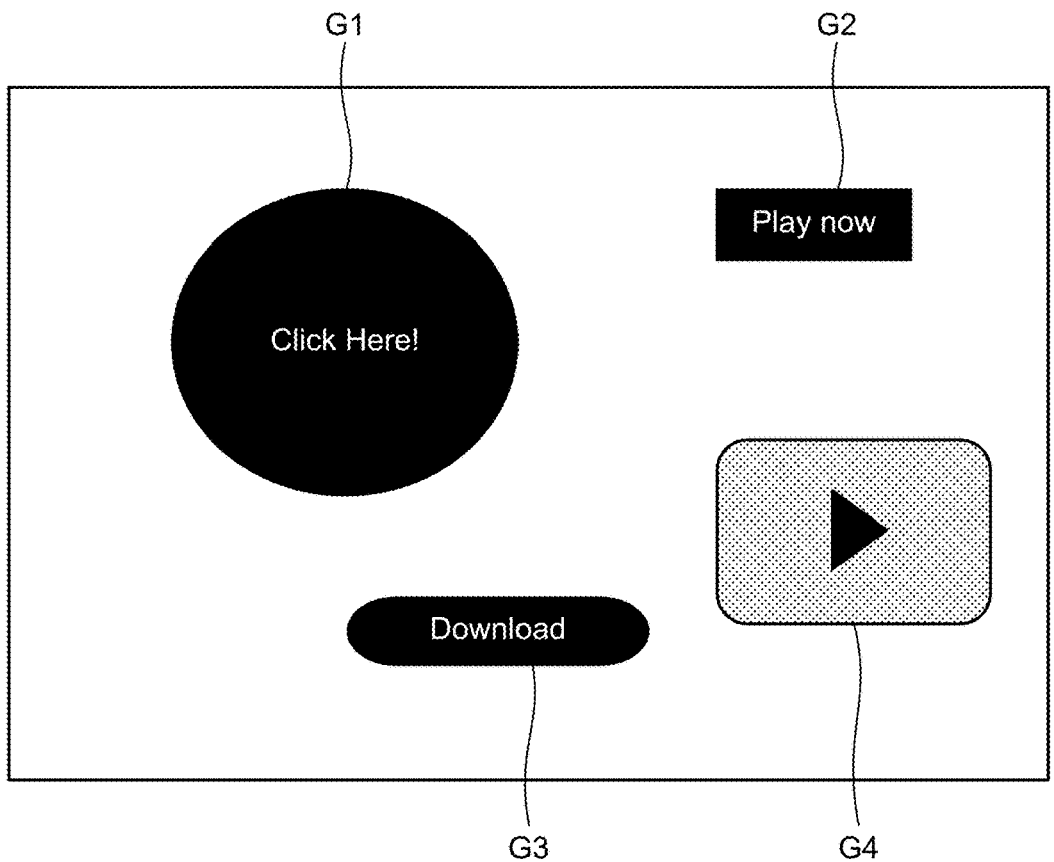
FIG. 6 is a diagram illustrating an example of an HTML source code as an analysis target.
FIG. 7 is a diagram illustrating an example of an image element as a detection target.

FIG. 6 is a diagram illustrating an example of an HTML source code as an analysis target. As described above, the HTML analysis unit 331 is able to detect each of Web elements described in rows R1 to R4 from an HTML source code by using the CSS selector or the XPath. In other words, the HTML analysis unit 331 is able to detect a Web element of "<a class="download-button">link</a>" described in the row R1 by using the CSS selector indicated by the serial number "1" in FIG. 5. Further, the HTML analysis unit 331 is able to detect a Web element of "<div>Play Now</div>" described in the row R4 by using the Xpath indicated by the serial number "4" in FIG. 5.

The image analysis unit 332 extracts, by performing image processing and a character string search, an image element that includes a character string that is set in advance for the category classified by the category classification unit 32 from the screen information on the Web browser screen that is extracted by the feature extraction unit 321.

FIG. 7 is a diagram illustrating an example of an image element as a detection target. In the embodiment, a region that is distinguishable by an image processing technique represented by edge detection in a screen drawn by the Web browser is assumed as the image element.

To detect, as the image element, an operation target that leads to user operation, the image analysis unit 332 first extracts a region for which a region size coincides with a contour that is set in advance for each of the categories of Web pages by using a known image processing technique. The contour to be detected is a graphic that is common to Web elements that are visually attractive to a user to lead to operation. Examples of the contour to be detected will be described for each of the categories. For example, if the category is the download page, a rectangle used as a download button may be the contour to be detected. Further, if the category is the video page, a triangle used as a video replay button may be the contour to be detected. The contours as described above are mere example, and the contour to be detected is not limited thereto.

As illustrated in FIG. 7, the image analysis unit 332 extracts regions G1 to G4 for each of which a region size coincides with a contour of any of a circle, an ellipse, a rectangle, and a triangle that are set for the respective categories of Web pages.

Subsequently, the image analysis unit 332 outputs the extracted region as an image, and extracts a character string in the image by using a known optical character recognition technique. If the extracted character string includes the second keyword that is set in advance, the image analysis unit 332 outputs the extracted image as an operation target image element. As described above, the second keyword is a character string that is drawn in the Web element leading to user operation and that is set for each of the categories. The second keyword is stored in the second keyword storage unit 22. For example, the second keyword may be "Download", "Play Now", or "Click Here".

As illustrated in FIG. 7, the image analysis unit 332 outputs the region G1 that includes "Click Here", the region G2 that includes "Play Now", and the region G3 that includes "Download" as operation target image elements. Further, as illustrated in FIG. 7, the image analysis unit 332 outputs the region G4 including a triangle serving as a video replay button as an operation target image element.

Figures 8, 9:
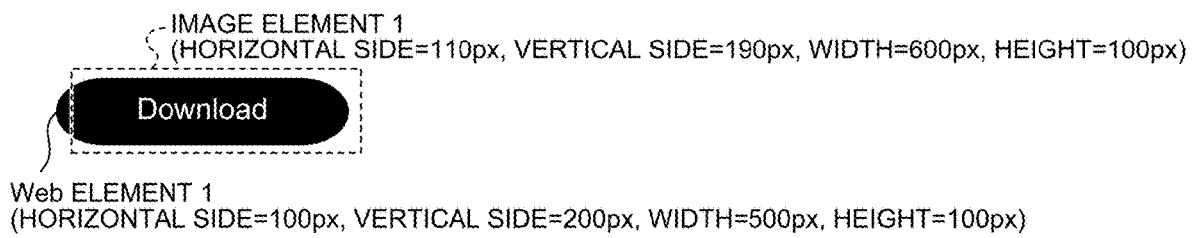
FIG. 8 is a diagram illustrating an example of an image element that is output by an image analysis unit illustrated in FIG. 2.
FIG. 9 is a diagram illustrating an example of a Web element and an image element that overlap with each other.

FIG. 8 is a diagram illustrating an example of the image element that is output by the image analysis unit 332 illustrated in FIG. 2. As illustrated in FIG. 8, the image analysis unit 332 outputs a horizontal side (coordinate), a vertical side (coordinate), a width (region size), and a height (region size) that are information indicating an image region of the image element, in association with the second keyword that is used for the search. The information indicating the image region of the image element is not limited to items as described above.

For example, as illustrated in FIG. 8, the image analysis unit 332 outputs a horizontal side of "100", a vertical side of "300", a width of "300", and a height of "600" as the information on the image element of the region G3 including "Download" (see FIG. 7), and also outputs the second keyword of "Download".

The operation target aggregation unit 333 aggregates the Web element extracted by the HTML analysis unit 331 and the image element extracted by the image analysis unit 332 and determines an aggregation result as the operation target. For example, the operation target aggregation unit 333 outputs the operation target after eliminating overlap between the extracted Web element and the extracted image element.

In this case, the operation target aggregation unit 333 first compares the region of the Web element and the region of the image element, and adopts a ratio of an area of an overlapping region to an area of a smaller one of the regions as an overlapping ratio. If the overlapping ratio exceeds a threshold that is set in advance, the operation target aggregation unit 333 determines that the Web element and the image element are the same operation target. Then, the operation target aggregation unit 333 eliminates the image element from the Web element and the image element that overlap with each other, and outputs only the Web element as the operation target.

FIG. 9 is a diagram illustrating an example of the Web element and the image element that overlap with each other. For example, a threshold value of the overlapping ratio is set to 70%. In FIG. 9, a case will be described in which an image element 1 (coordinate (horizontal side=110 px, vertical side=190 px), width=600 px, height=110 px) and a Web element 1 (coordinate (horizontal side=100 px, vertical side=200 px), width=500 px, height=100 px) overlap with each other. In this case, an area where the image element 1 and the Web element 1 overlap with each other is 40000 px.

As a result, the operation target aggregation unit 333 performs a calculation such that the overlapping ratio is 80% of an area of the Web element 1 (50000 px) that is a smaller region, and determines that the image element 1 and the Web element 1 overlap with each other. Then, the operation target aggregation unit 333 eliminates the image element 1 from the image element 1 and the Web element 1, and outputs the Web element 1 as the operation target.

[Operation Execution Unit]

A process performed by the operation execution unit 34 will be described below. The operation execution unit 34 performs operation on the operation target detected by the operation target detection unit 33. The operation execution unit 34 performs operation on the operation target that is present in the analysis target Web page. The operation performed by the operation execution unit 34 may be click on the operation target detected by the operation target detection unit 33, return operation on a browser history, or the like. The operation is not limited to the example as described above.

[Function Hook Unit]

The function hook unit 35 will be described below. The function hook unit 35 includes a function overwriting unit 351 (overwriting unit) and a function call detection unit 352 (third detection unit) in order to detect a change of the Web page caused by the operation performed by the operation execution unit 34.

The function overwriting unit 351 overwrites the JavaScript function at the start of reading the analysis target Web page, and adds a process of notifying the function call detection unit 352 of a parameter that is input to the JavaScript function.

The function hook unit 35 generates, in advance, a JavaScript source code for inserting, in a JavaScript function that is related to an operation event leading to user operation, a process of notifying the browser extension function of a parameter that is input immediately when the function is called. The function overwriting unit 351 overwrites the JavaScript function in the HTML source code of the analysis target Web page.

Figure 10:
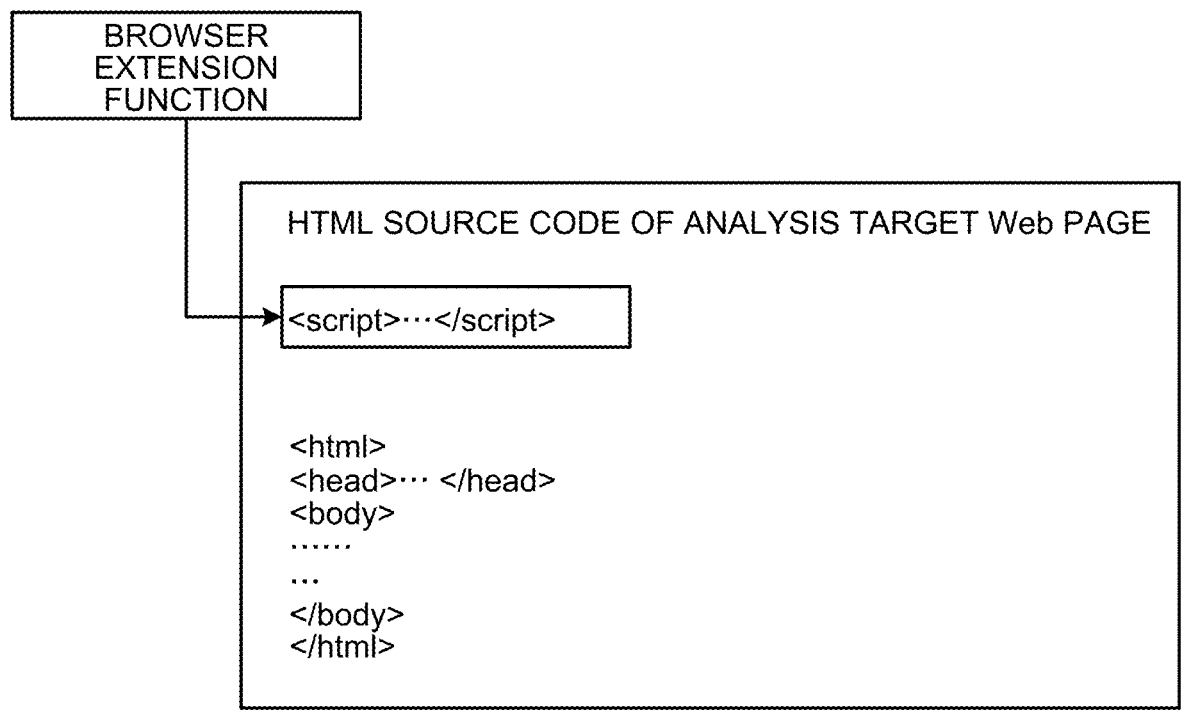
FIG. 10 is a diagram illustrating an example of insertion of a JavaScript (registered trademark) function overwriting process.

FIG. 10 is a diagram illustrating an example of insertion of a JavaScript function overwriting process. As illustrated in a frame in FIG. 10, every time the Web browser reads a Web page, the generated JavaScript source code is inserted as a Script tag at the top of the HTML source code of the Web page at the start of reading, so that a browser extension function is added. Meanwhile, an alert function, a confirm function, or a function for installing the browser extension function may be adopted as the JavaScript function related to the operation event that leads to user operation, but the functions are not limited to items as described above.

When receiving the notice and when a JavaScript function related to an operation event leading to user operation is called, the function call detection unit 352 acquires a parameter that is input to the JavaScript function, and detects the operation event. In other words, the function call detection unit 352 detects that the overwritten JavaScript function has been called. A case in which the overwritten JavaScript function has been called is a case in which the operation event that leads to user operation has occurred.

Therefore, the function hook unit 35 is able to detect occurrence of the operation event that leads to user operation through a detection process performed by the function call detection unit 352. In other words, the function hook unit 35 detects a change of the Web page caused by the operation performed by the operation execution unit 34. As will be described later, in the log data output by the log output unit 36, occurrence of the operation event that leads to user operation and the operation content or the operation target that leads to the operation event leading to user operation at the time of the occurrence are recorded in an associated manner.

[Log Output Unit]

The log output unit 36 will be described below. The log output unit 36 includes a communication recording unit 361, an event recording unit 362, and an image capture recording unit 363.

The communication recording unit 361 records communication that has occurred due to the operation performed by the operation execution unit 34 in order to analyze a Web page, in conjunction with the detection of the operation event by the function hook unit 35. The event recording unit 362 records the operation event detected by the function hook unit 35, in conjunction with the detection of the operation event by the function hook unit 35. Then, the image capture recording unit 363 records the Web browser screen that has been changed due to the operation performed by the operation execution unit 34, in conjunction with the detection of the operation event by the function hook unit 35. The log output unit 36 outputs log data in which the communication recorded by the communication recording unit 361, the event recorded by the event recording unit 362, and the Web browser screen recorded by the image capture recording unit 363 are associated with the URL of the analysis target Web page.

FIG. 11 is a diagram illustrating an example of the operation event detected by the function hook unit 35 illustrated in FIG. 2, the operation target, and the operation. As illustrated in FIG. 11, if the function call detection unit 352 detects the operation event while the operation execution unit 34 is performing operation on the operation target, the event recording unit 362 extracts operation that has been just performed by the operation execution unit 34, the operation target, and a URL of the Web page on which the operation is performed.

As illustrated in FIG. 11, the operation event is an event of a Web browser that has occurred due to the operation performed by the operation execution unit 34, and may be file download, installation of a browser extension function, and display of an alert dialog. The operation event is not limited to items as described above. Further, information indicating a target on which the operation has been performed by the operation execution unit 34 is recorded in the item of the operation target. For example, a coordinate of the operation target, a region size, and an actual image are recorded in the item of the operation target. Furthermore, various kinds of operation, such as click and return operation, are recorded in the item of the operation. Moreover, the URL of the Web page on which the operation has been performed by the operation execution unit 34 is recorded in the item of the URL.

[Repetition Process]

Here, in the analysis apparatus 4, the category classification unit 32 performs category classification every time the analysis target Web page is changed. Then, in the analysis apparatus 4, if the category of the Web page is classified, the operation target detection unit 33 detects operation targets from the Web page, and the operation execution unit 34 sequentially performs operation on each of the operation targets. Then, in the analysis apparatus 4, the operation on the operation target and each of the processes needed for the operation are recursively repeated until a predetermined termination condition is met. Then, in the analysis apparatus 4, every time the operation is performed, an operation event that occurs after the operation execution unit 34 has performed the operation on the operation target is detected.

Here, a repetition process in the analysis apparatus 4 will be described. First, it is assumed that a page that is input by the URL input unit 31 and that is a first destination page at the start of analysis of the Web page is referred to as a root page. In the analysis apparatus 4, if the Web page is changed after the operation execution unit 34 has performed the operation, category classification on the Web page, detection of an operation target, and operation on the Web page are recursively repeated on the changed page. The change of the Web page may include a change of an HTML structure and a change to a different Web page, but is not limited to items as described above.

As a condition to move to the Web page that has been present before the change, a condition in which a predetermined number of recursions that is set in advance is exceeded or a condition in which the operation target is not detected may be set, for example. Therefore, if the predetermined number of recursions that is set in advance is exceeded or if the operation target is not detected, the analysis apparatus 4 moves to the Web page that has been present before the change and performs operation on an operation target on which the operation has not been performed. Then, as a termination condition, a condition in which the operation on all of the operation targets in the root page is completed may be set, for example. Therefore, if the operation on all of the operation targets in the root page is completed, the analysis apparatus 4 terminates the analysis of the Web page.

Figure 12:
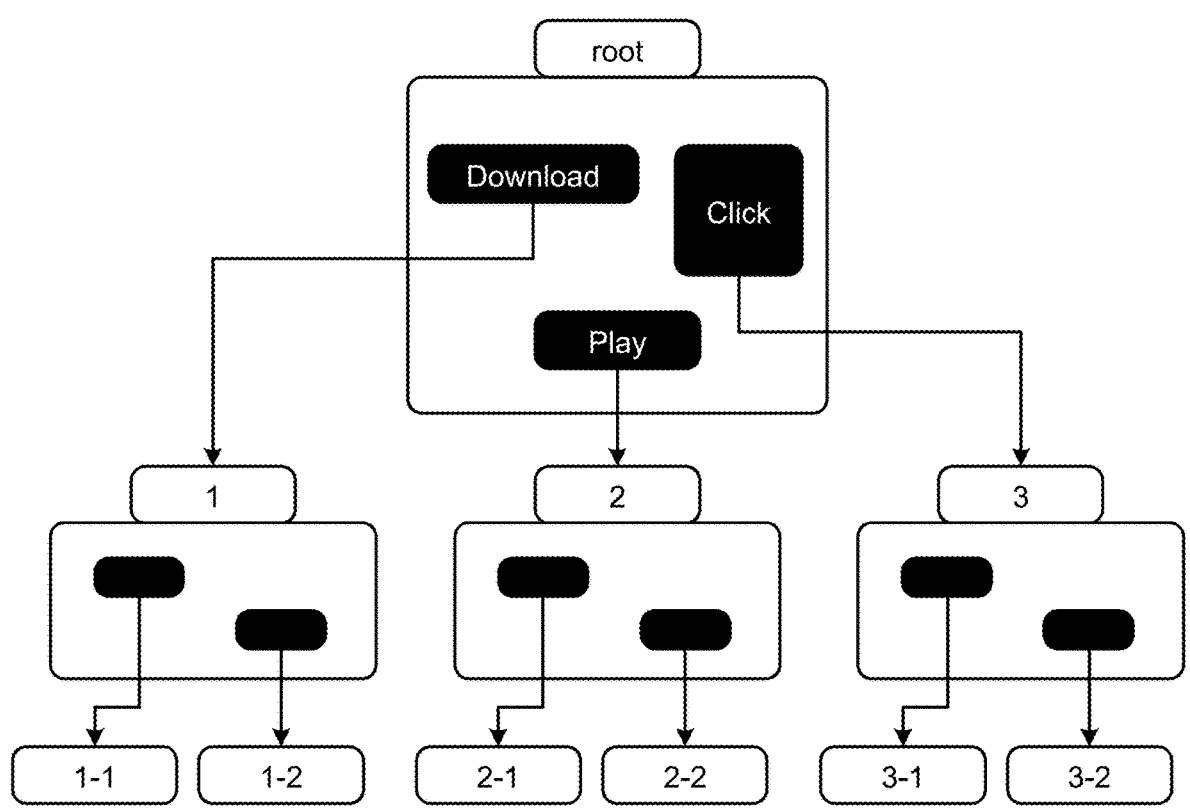
FIG. 12 is a diagram for explaining a repetition process including operation on an operation target in the analysis apparatus illustrated in FIG. 2.

FIG. 12 is a diagram for explaining the repetition process including the operation on the operation target in the analysis apparatus 4 illustrated in FIG. 2. For example, in FIG. 12, a root page of "root" is displayed at the top. In the root page of "root", a "Download" button, a "Play" button, and a "Click" button are present as operation targets.

If the operation execution unit 34 operates the "Download" button, the Web page is moved to a Web page "1". In this case, the category classification unit 32 performs category classification and the operation target detection unit 33 detects operation targets with respect to the Web page "1". Then, the operation execution unit 34 sequentially performs operation on the operation targets of the Web page "1". As a result, the Web page is moved to a Web page "1-1". Subsequently, the category classification unit 32 performs category classification, the operation target detection unit 33 detects operation targets, and the operation execution unit 34 performs operation on one of the operation targets with respect to the Web page "1-1".

Here, if the number of recursions (the number of repetitions) is exceeded, in the analysis apparatus 4, the Web page is moved to the Web page "1" that has been present before the change, and operation is performed on the other one of the operation targets of the Web page "1". Then, if the Web page is moved to a Web page "1-2", the analysis apparatus 4 similarly performs the category classification, the detection of operation targets, and the execution of operation.

Subsequently, in the analysis apparatus 4, if the process on all of the operation targets of the Web page "1" is completed, the page is returned to the root page of "root", the "Play" button is operated, and the category classification, the detection of operation targets, and the execution of operation are similarly performed on the Web page "2". In this manner, the analysis apparatus 4 performs the category classification, the detection of operation targets, and the execution of operation until the operation on all of the operation targets in the root page is completed. In other words, the category classification unit 32, the operation target detection unit 33, the operation execution unit 34, and the function hook unit 35 terminate the processes when the termination condition that is set in advance is met. Then, if the operation on all of the operation targets in the root page is completed, analysis of the Web page is terminated.

EXAMPLE

Figure 13:
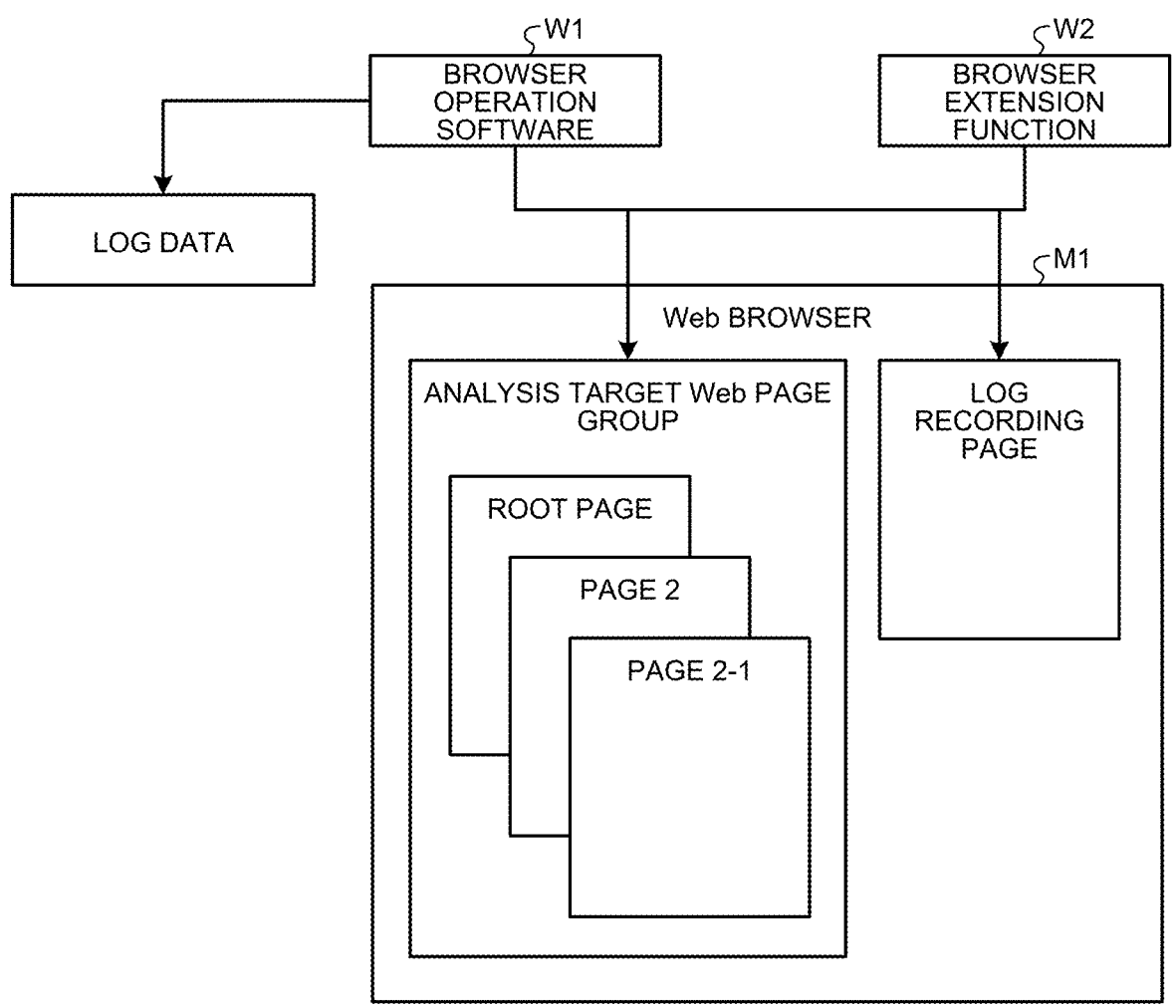
FIG. 13 is a diagram for explaining a configuration example of a browser automatic operation system to which the embodiment is applied.

FIG. 13 is a diagram for explaining a configuration example of a browser automatic operation system to which the embodiment is applied. As illustrated in FIG. 13, as an example of the analysis apparatus 4 according to the embodiment, a structure that includes software for operating a Web browser M1 and a function implemented by a browser extension function may be adopted, for example.

As for the category classification unit 32, the operation target detection unit 33, the operation execution unit 34, and the image capture recording unit 363, a process of operating the Web browser is set in advance by using software W1 that automating browser operation. Further, the function hook unit 35, the communication recording unit 361, and the event recording unit 362 are implemented by a browser extension function W2.

As in the present example, by causing both of the function for operating the Web browser and the function implemented by the browser extension function to perform read and write of a log with respect to a log recording page, it is possible to associate the executed operation and the operation event that has occurred due to the operation. Then, the log output unit 36 outputs the log data. Meanwhile, the software for automating the browser operation may be Selenium that is a browser operation automation tool. The software for automating the browser operation is not limited to this example.

In other words, as in the present example, by adopting software capable of writing an operation process of the Web browser, it is possible to simplify operation settings, reduce development costs, perform file input/output operation, and make an association with external tools. Further, as in the present example, the Web browser extension function is used to acquire a communication log that is not obtainable by the above-described software and operation events on the Web browser. With this configuration, in the present example, by causing the software for automating the browser operation and the browser extension function to perform communication with each other, it is possible to, when an attack that leads to user operation is observed, identify a content of the attack, the operation target that serves as a starting point, and operation performed on the operation target.

[Flow of Analysis Process]

Figure 14:
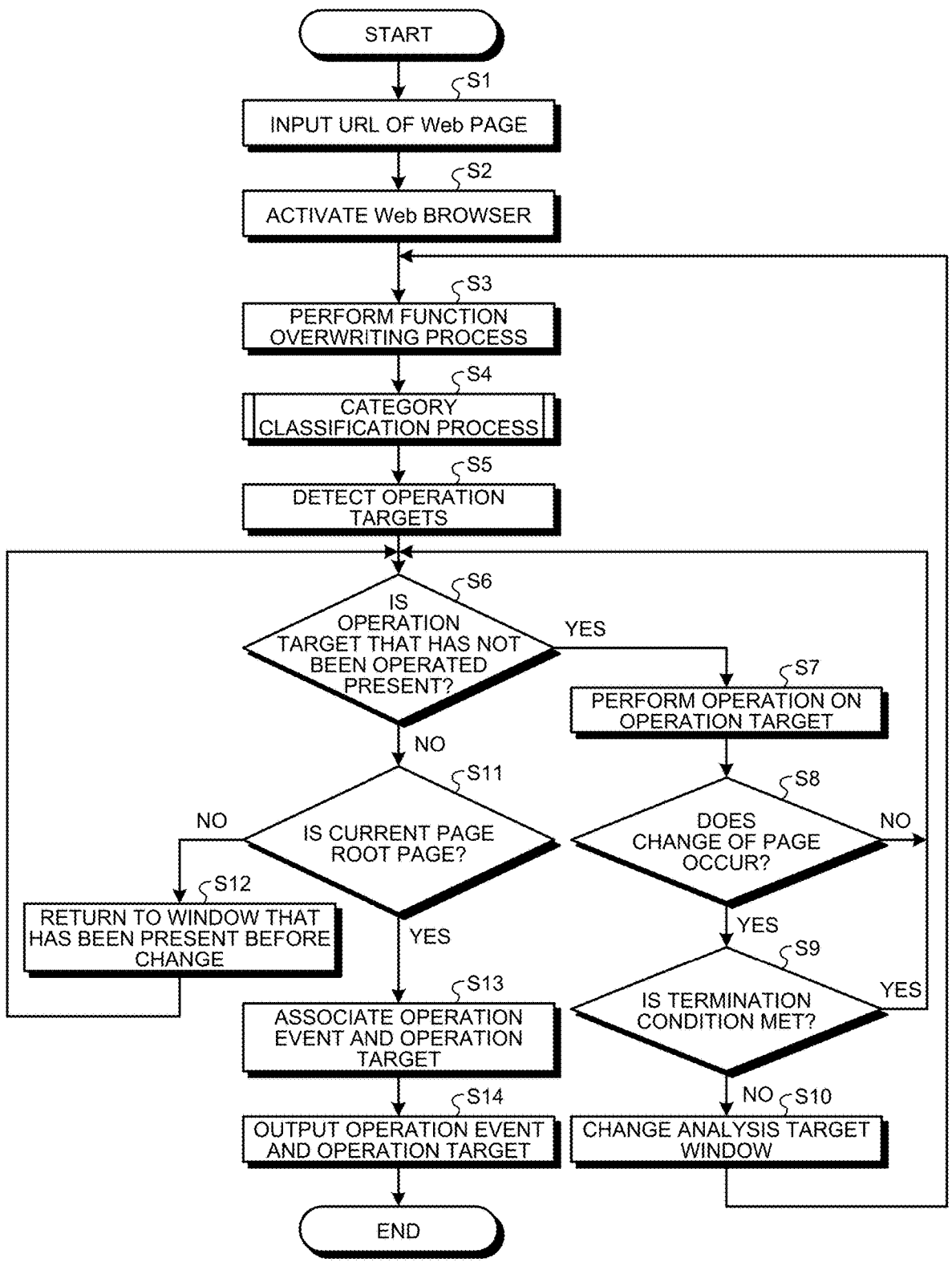
FIG. 14 is a flowchart illustrating the flow of an analysis process according to the embodiment.

The analysis process performed by the analysis apparatus 4 will be described below. FIG. 14 is a flowchart illustrating the flow of the analysis process according to the embodiment.

As illustrated in FIG. 14, first, if the URL input unit 31 receives input of a URL of an analysis target Web page (Step S1), a Web browser is activated by using the browser automatic operation system as illustrated in FIG. 13 (Step S2), and the analysis process on the Web page is started. Then, in the function hook unit 35, the function overwriting unit 351 performs the function overwriting process of overwriting the JavaScript function in the HTML source code of the analysis target Web page (Step S3).

Then, the category classification unit 32 accesses the URL of the analysis target Web page and performs a category classification process of classifying the analysis target Web page into a certain category (Step S4). The operation target detection unit 33 detects operation targets of user operation from the analysis target Web page, in accordance with the detection method that is set in advance for the category classified by the category classification unit 32 (Step S5). At Step S5, the HTML analysis unit 331 detects a Web element including a predetermined character string from the HTML source code by performing a character string search, and the image analysis unit 332 extracts an image element including a character string that is set in advance for the category from the screen information on the Web browser screen by performing image processing and a character string search. Then, the operation target aggregation unit 333 eliminates the Web element and the image element that overlap with each other.

Then, as described above with reference to FIG. 12, the analysis apparatus 4 performs operation on the operation target, and if the Web page is changed after the operation, classification into the category of the Web page, detection of operation targets, and operation on the Web page are recursively repeated on the changed page.

First, the operation execution unit 34 determines whether an operation target that has not been operated is present among the operation targets that are detected by the operation target detection unit 33 with respect to the analysis target Web page (Step S6). If it is determined that the operation target that has not been operated is present (Step S6: Yes), the operation execution unit 34 performs operation on the operation target (Step S7). Then, the function hook unit 35 determines whether a change of the Web page occurs due to the operation performed by the operation execution unit 34, in the detection performed by the function call detection unit 352 (Step S8).

If the function hook unit 35 determines that the change of the Web page has occurred (Step S8: Yes), the operation execution unit 34 determines whether the termination condition is met (Step S9). The termination condition is a case in which, for example, operation on all of the operation targets in the root page is completed. If it is determined that the termination condition is not met (Step S9: No), the operation execution unit 34 changes an analysis target window (Step S10), and the process proceeds to Step S3. In this case, the function overwriting unit 351 performs the function overwriting process of overwriting the JavaScript function in the HTML source code of the changed Web page.

In contrast, if the function hook unit 35 determines that the change of the Web page has not occurred (Step S8: No), or if the operation execution unit 34 determines that the termination condition is met (Step S9: Yes), the process returns to Step S6.

If it is determined that the operation target that has not been operated is not present (Step S6: No), the operation execution unit 34 determines whether the current page is the root page (Step S11). If it is determined that the current page is not the root page (Step S11: No), the operation execution unit 34 returns to the window that has been present before the change (Step S12). Meanwhile, the processes at Steps S6, S11, and S12 are repeated until the page is returned to the root page.

Then, if the operation execution unit 34 determines that the current page is the root page (Step S11: Yes), the log output unit 36 associates the operation event detected by the function hook unit 35 and the operation target detected by the operation target detection unit 33 (Step S13), outputs log data including the operation event and the operation target that are associated with each other (Step S14), and terminates the process. Meanwhile, the log data is data in which the Web browser screen that has been changed due to the operation performed by the operation execution unit 34 and the URL of the analysis target Web page are associated with each other, together with the operation event and the operation target.

[Category Classification Process]

Figure 15:
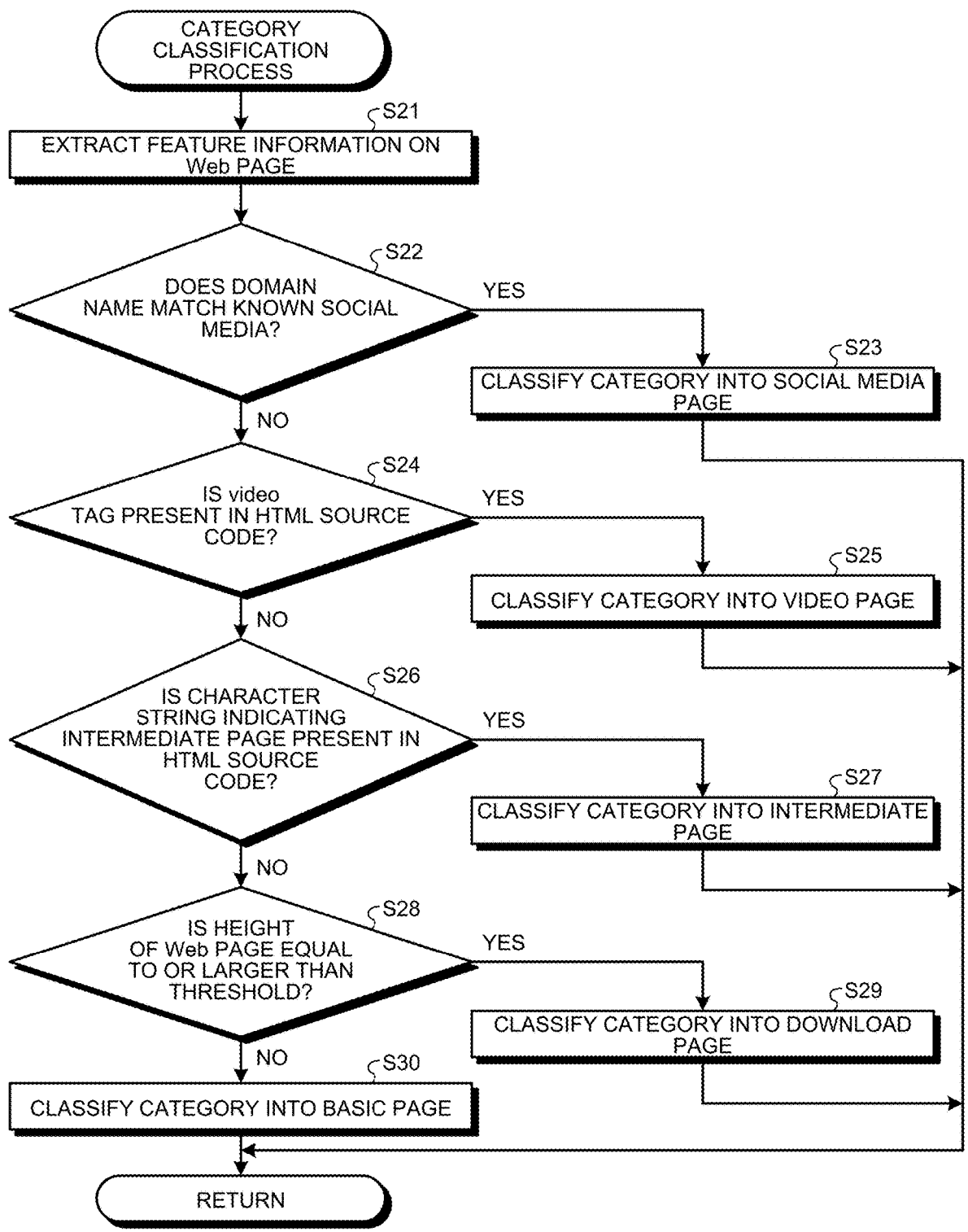
FIG. 15 is a flowchart illustrating the flow of a category classification process illustrated in FIG. 14.

The category classification process (Step S4) will be described below. FIG. 15 is a flowchart illustrating the flow of the category classification process illustrated in FIG. 14.

As illustrated in FIG. 15, in the category classification unit 32, the feature extraction unit 321 accesses the URL of the analysis target Web page, and extracts, as the feature information, the communication destination information on the accessed Web page, the HTML source code information, or the screen information on the Web browser screen (Step S21). Subsequently, the category determination unit 322 uses a predetermined classification rule to determine a category of the Web page, on the basis of a feature amount that is extracted by the feature extraction unit 321. For example, the category determination unit 322 determines the category of the Web page by using a determination rule as described below.

First, the category determination unit 322 determines whether the feature information matches a domain name of a known social media site (Step S22). If it is determined that the feature information matches the domain name of the known social media site (Step S22: Yes), the category determination unit 322 classifies the category of the Web page into the social media page (Step S23), and terminates the process.

Further, if it is determined that the feature information does not match the domain name of the known social media site (Step S22: No), the category determination unit 322 determines whether a video tag is present in the HTML source code that is extracted as the feature information (Step S24).

If it is determined that the video tag is present in the HTML source code that is extracted as the feature information (Step S24: Yes), the category determination unit 322 classifies the category of the Web page into the video page (Step S25), and terminates the process.

In contrast, if it is determined that the video tag is not present in the HTML source code that is extracted as the feature information (Step S24: No), the category determination unit 322 determines whether a character string indicating the intermediate page is present in the HTML source code that is extracted as the feature information (Step S26). The character string indicating the intermediate page may be, for example, "Wait 5 seconds", "Skip Ad", or the like. If it is determined that the character string indicating the intermediate page is present in the HTML source code that is extracted as the feature information (Step S26: Yes), the category determination unit 322 classifies the category of the Web page into the intermediate page (Step S27), and terminates the process.

If it is determined that the character string indicating the intermediate page is not present in the HTML source code that is extracted as the feature information (Step S26: No), the category determination unit 322 determines whether a height of the Web page is equal to or larger than a threshold that is set in advance (Step S28). If it is determined that the height of the Web page is equal to or larger than the threshold that is set in advance (Step S28: Yes), the category determination unit 322 classifies the category of the Web page into the download page (Step S29), and terminates the process. If it is determined that the height of the Web page is not equal to or larger than the threshold that is set in advance (Step S28: No), the category determination unit 322 classifies the category of the Web page into the basic page (Step S30), and terminates the process.

Effects of Embodiment

As described above, the analysis apparatus 4 according to the embodiment accesses a URL of a target Web page, and classifies the analysis target Web page into a category that is an index indicating a Web page leading method. Then, the analysis apparatus 4 detects operation targets of user operation from the analysis target Web page, in accordance with the detection method that is set in advance for the classified category. Then, the analysis apparatus 4 performs operation on the detected operation target, and detects an operation event that occurs after execution of the operation on the operation target. Then, the analysis apparatus 4 outputs the log data in which the communication that has occurred due to the operation, the detected operation event, and the Web browser screen that has been changed due to the operation are associated with the URL of the analysis target Web page.

Therefore, by accessing the URL of the target Web page and classifying the analysis target Web page into a category that is an index indicating the Web page leading method, the analysis apparatus 4 is able to appropriately detect an operation target from a number of operable regions that are present in the Web page. Further, the analysis apparatus 4 actually performs operation on the detected operation target, and detects occurrence or non-occurrence of an operation event that leads to user operation for each operation. As a result, according to the analysis apparatus 4, it is possible to accurately and effectively identify operation that serves as a starting point of an attack and an operation target of the operation.

By performing the processes as described above, the analysis apparatus 4 is able to observe the attack that leads to user operation via the Web page. Further, the analysis apparatus 4 outputs the log data as an observation result. Therefore, the determination apparatus 3 is able to identify the operation that serves as the starting point to lead the user operation to an attack and an operation target of the operation, by using the log data.

Furthermore, in the analysis apparatus 4, the category classification unit 32 actually accesses the URL of the analysis target Web page and extracts, as the feature information, the communication destination information on the accessed Web page, the HTML source code information, or the screen information on the Web browser screen. Then, the analysis apparatus 4 analyzes the Web page on the basis of the extracted feature amount, so that it is possible to determine a Web category for determining a method of detecting an operation target that serves as the starting point of the attack leading to user operation and for determining operation that is performed on the operation target.

Moreover, in the analysis apparatus 4, the operation target detection unit 33 extracts a Web element including a character string that is set in advance for a category from the extracted HTML source code, by performing a character string search. Then, the operation target detection unit 33 extracts an image element including a character string that is set in advance for the category from the screen information on the extracted Web browser screen, by performing image processing and a character string search. In other words, in the analysis apparatus 4, by changing the method of detecting the operation target for each of the classified categories, it is possible to appropriately detect an operation target that is highly likely to serve as the starting point of the attack leading to user operation from a number of operable regions that are present in the Web page. Furthermore, in the analysis apparatus 4, the operation target detection unit 33 aggregates the extracted Web element and the image element and determines the aggregation as the operation target, so that it is possible to avoid overlap of operation targets. As a result, according to the analysis apparatus 4, it is possible to effectively perform operation on the operation target that is highly likely to lead to an attack, and it is possible to reduce an analysis time.

Moreover, in the analysis apparatus 4, operation is sequentially performed on the extracted operation targets, and a change of the Web page that is caused by the operation is detected in accordance with the execution of the operation. Then, in the analysis apparatus 4, by repeating classification of a Web page, detection of operation targets, and execution of operation on the operation targets, it is possible to appropriately observe the operation content and the operation target that leads to an attack. Furthermore, in the analysis apparatus 4, it is possible to select optimal operation that matches an analysis stage through the repetition process, so that it is possible to cause a complicated attack that leads to a plurality of kinds of operation to occur, and it is possible to accurately observe how the complicated attack is caused to occur.

Moreover, in the analysis apparatus 4, the function hook unit 35 overwrites the JavaScript function at the start of reading the analysis target Web page, and adds the process of giving a notice of a parameter that is input to the JavaScript function. Then, upon receiving the notice, the function hook unit 35 acquires the parameter that is input to the JavaScript function when the JavaScript function related to an operation event that leads to user operation is called, and detects an operation event. In other words, the function hook unit 35 is able to acquire the parameter that is input to the JavaScript function immediately when the function is called, so that it is possible to analyze whether a function that may be related to the operation event leading to user operation is used for an attack.

[System Configuration, etc.]

The components of the apparatuses illustrated in the drawings are conceptual function, and need not be physically configured in the manner as illustrated in the drawings. In other words, specific forms of distribution and integration of the apparatuses are not limited to those illustrated in the drawings, and all or part of the apparatuses may be functionally or physically distributed or integrated in arbitrary units depending on various loads or use conditions Further, all or an arbitrary part of the processing functions implemented by the apparatuses may be realized by a CPU and a program analyzed and executed by the CPU, or may be realized by hardware using wired logic.

Furthermore, of the processes described in the embodiment, all or part of a process described as being performed automatically may also be performed manually. Alternatively, all or part of a process described as being performed manually may also be performed automatically by known methods. In addition, the processing procedures, control procedures, specific names, and information including various kinds of data and parameters illustrated in the above-described document and drawings may be arbitrarily changed unless otherwise specified.

[Program]

Figure 16:
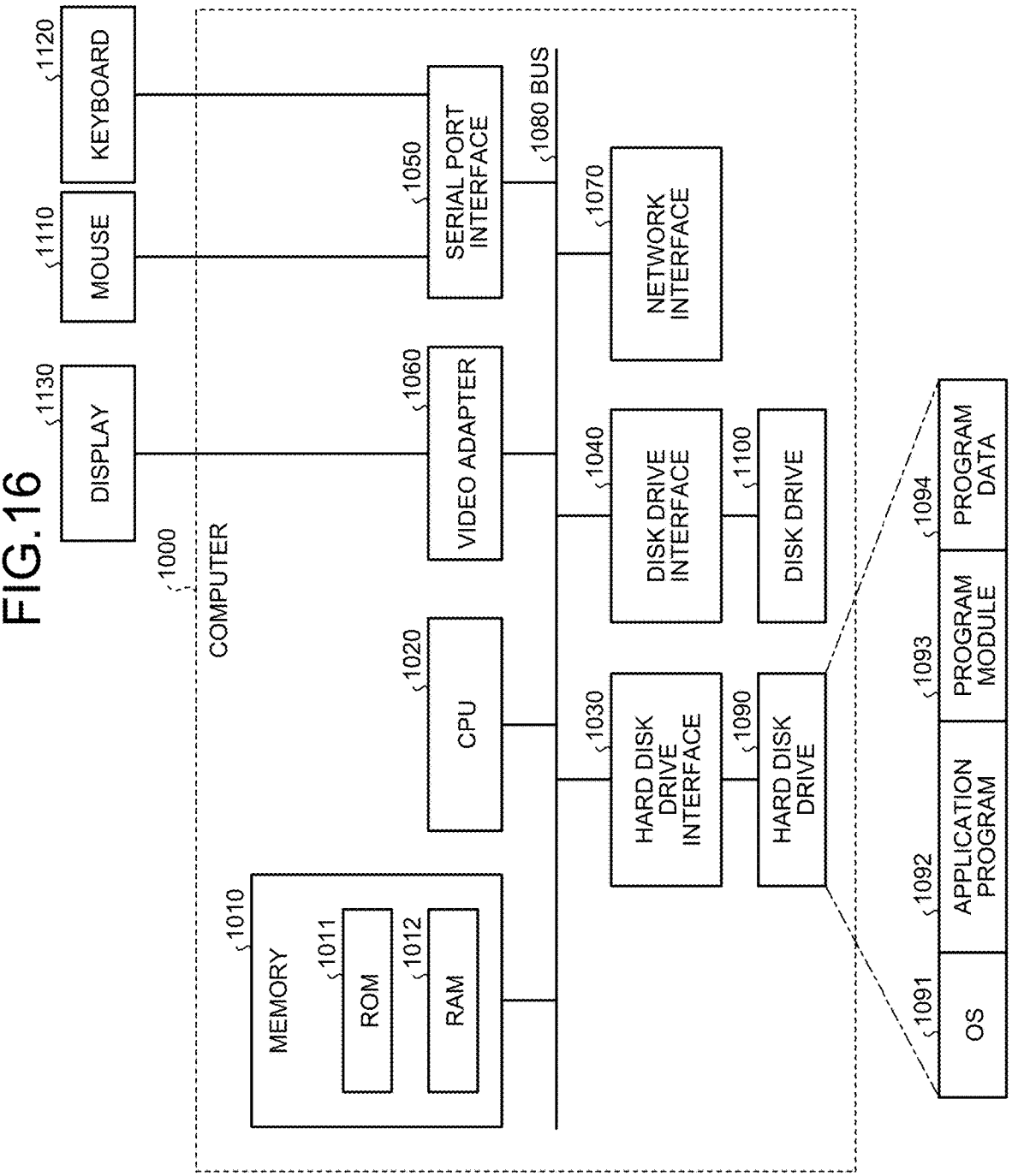
FIG. 16 is a diagram illustrating an example of a computer that implements the analysis apparatus by executing a program.

FIG. 16 is a diagram illustrating an example of a computer that realizes the analysis apparatus 4 by executing a program. A computer 1000 includes, for example, a memory 1010 and a CPU 1020. Further, the computer 1000 includes a hard disk drive interface 1030, a disk drive interface 1040, a serial port interface 1050, a video adapter 1060, and a network interface 1070. All of the units are connected to one another via a bus 1080.

The memory 1010 includes a read only memory (ROM) 1011 and a RAM 1012. The ROM 1011 stores therein, for example, a boot program, such as Basic Input Output System (BIOS). The hard disk drive interface 1030 is connected to a hard disk drive 1090. The disk drive interface 1040 is connected to a disk drive 1100. For example, a removable storage medium, such a magnetic disk or an optical disk, is inserted in the disk drive 1100. The serial port interface 1050 is connected to, for example, a mouse 1110 and a keyboard 1120. The video adapter 1060 is connected to, for example, a display 1130.

The hard disk drive 1090 stores therein, for example, an OS 1091, an application program 1092, a program module 1093, and program data 1094. In other words, the program that defines each of the processes performed by the analysis apparatus 4 is implemented as the program module 1093 in which a computer-executable code is written. The program module 1093 is stored in, for example, the hard disk drive 1090. For example, the program module 1093 that performs the same process as the functional configuration of the analysis apparatus 4 is stored in the hard disk drive 1090. Meanwhile, the hard disk drive 1090 may be replaced with an SSD.

Further, the setting data used in the processes in the embodiment as described above is stored, as the program data 1094, in the memory 1010 or the hard disk drive 1090, for example. Then, the CPU 1020 reads the program module 1093 and the program data 1094 stored in the memory 1010 or the hard disk drive 1090 onto the RAM 1012 and executes the program module 1093 and the program data 1094 if needed.

Meanwhile, the program module 1093 and the program data 1094 need not always be stored in the hard disk drive 1090, but may be stored in, for example, a removable storage medium and read by the CPU 1020 via the disk drive 1100 or the like. Alternatively, the program module 1093 and the program data 1094 may be stored in a different computer that is connected via a network (a LAN, a Wide Area Network (WAN), or the like). Then, the program module 1093 and the program data 1094 may be read by the CPU 1020 from the different computer via the network interface 1070.

The embodiment to which the invention made by the present inventors is applied has been described above, but the present invention is not limited to the description and the drawings that are a part of the disclosure of the present invention by the embodiment. In other words, all of other embodiments, examples, operational techniques, and the like that may be made by a person skilled in the art on the basis of the embodiment are included in the scope of the present invention.

REFERENCE SIGNS LIST 1 analysis system
2 network
3 determination apparatus
4 analysis apparatus
10 communication unit
20 storage unit
21 first keyword storage unit
22 second keyword storage unit
23 log data storage unit
30 control unit
31 URL input unit
32 category classification unit
33 operation target detection unit
34 operation execution unit
35 function hook unit
36 log output unit
321 feature extraction unit
322 category determination unit
331 HTML analysis unit
332 image analysis unit
333 operation target aggregation unit
351 function overwriting unit
352 function call detection unit
361 communication recording unit
362 event recording unit
363 image capture recording unit

The invention claimed is:

1. An analysis apparatus that analyzes a Uniform Resource Locator (URL) of a Web page, the analysis apparatus comprising:
a memory; and
a processor coupled to the memory and programmed to execute a process comprising:
classifying, upon receiving input of an URL of an analysis target Web page, access the URL of the analysis target Web page and classify the analysis target Web page into a category that is an index indicating a Web page leading method;
first detecting an operation target of user operation from the analysis target Web page in accordance with a detection method that is set in advance for the category classified by the classifying;
executing operation on the operation target detected by the first detecting;
second detecting an operation event that occurs after the executing has performed the operation on the operation target; and
outputting log data in which communication that has occurred due to the operation performed by the executing, the operation event detected by the second detecting, and a Web browser screen that has been changed due to the operation performed by the executing are associated with the URL of the analysis target Web page.

2. The analysis apparatus according to claim 1, wherein the classifying comprises
first extracting, accessing the URL of the analysis target Web page, and extracting, as feature information, one of communication information on the accessed Web page, Hypertext Markup Language (HTML) source code information, and screen information on the Web browser screen, and
determining configured to determine a category of the Web page on the basis of a feature amount extracted by the first extracting.

3. The analysis apparatus according to claim 2, wherein the first detecting, comprises
second extracting, by performing a character string search, a Web element that includes a character string that is set in advance for the category classified by the classifying from an HTML source cord extracted by the first extracting,
third extracting, by performing image processing and a character string search, an image element that includes a character string that is set in advance for the category classified by the classifying from the screen information on the Web browser screen extracted by the first extracting, and an aggregation unit configured to aggregate the Web element extracted by the first analysing and the image element extracted by the third extracting and determine an aggregation result as an operation target.

4. The analysis apparatus according to claim 1, wherein when the analysis target Web page is changed, the classifying classifies the changed Web page into the category, when the classifying classifies the category of the Web page, the first detecting detects the operation target from the Web page, the executing sequentially performs operation on the operation target detected by the first detecting, the second detecting detects a change of the Web page caused by the operation performed by the executing, the classifying, the first detecting, the executing, and the second detecting terminate processes when a termination condition that is set in advance is met, and the outputting outputs the log data when the termination condition is met.

5. The analysis apparatus according to claim 1, wherein the second detecting comprises
- overwriting a JavaScript (registered trademark) function at a start of reading the analysis target Web page, and add a process of giving a notice of a parameter that is input to the JavaScript function, and
- third detecting, when receiving the notice and when a JavaScript function related to an operation event leading to user operation is called, acquire a parameter that is input to the JavaScript function, and detect the operation event.

6. An analysis method performed by an analysis apparatus that analyzes a Uniform Resource Locator (URL) of a Web page, the analysis method comprising:
- a step of accessing a URL of an analysis target Web page upon receiving input of the URL of the analysis target Web page, and classifying the analysis target Web page into a category that is an index indicating a Web page leading method;
- a step of detecting an operation target of user operation from the analysis target Web page in accordance with a detection method that is set in advance for the classified category;
- a step of performing operation on the detected operation target;
- a step of detecting an operation event that occurs after the operation has been performed on the operation target; and
- a step of outputting log data in which communication that has occurred due to the operation, an operation event that is detected at the detecting the operation event, and a Web browser screen that has been changed due to the operation are associated with the URL of the analysis target Web page.

7. A non-transitory computer-readable recording medium having stored therein an analysis program for causing a computer to execute a process comprising:
- a step of accessing a Uniform Resource Locator (URL) of an analysis target Web page upon receiving input of the URL of the analysis target Web page, and classifying the analysis target Web page into a category that is an index indicating a Web page leading method;
- a step of detecting an operation target of user operation from the analysis target Web page in accordance with a detection method that is set in advance for the classified category;
- a step of performing operation on the detected operation target;
- a step of detecting an operation event that occurs after the operation has been performed on the operation target; and
- a step of outputting log data in which communication that has occurred due to the operation, an operation event that is detected at the detecting the operation event, and a Web browser screen that has been changed due to the operation are associated with the URL of the analysis target Web page.

* * * * *